(12) United States Patent
Whitehead

(10) Patent No.: US 8,474,181 B2
(45) Date of Patent: Jul. 2, 2013

(54) BIODEGRADABLE PLANT POT

(75) Inventor: John F. Whitehead, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 165 days.

(21) Appl. No.: 13/073,193

(22) Filed: Mar. 28, 2011

(65) Prior Publication Data

US 2011/0167723 A1     Jul. 14, 2011

(51) Int. Cl.
*A01G 9/02*     (2006.01)
*A01G 9/10*     (2006.01)

(52) U.S. Cl.
USPC ............... 47/66.4; 47/65.7; 47/77; 47/74

(58) Field of Classification Search
USPC ............... 47/65.7, 66.4, 74, 73, 77; 229/201, 229/236, 240, 198.2, 4.5; 220/62
See application file for complete search history.

(56) References Cited

U.S. PATENT DOCUMENTS

| | | | | |
|---|---|---|---|---|
| 448,143 | A * | 3/1891 | Piper | 229/4.5 |
| 2,780,401 | A * | 2/1957 | Stevens | 229/406 |
| 3,313,333 | A * | 4/1967 | Lordi | 220/666 |
| 3,506,183 | A * | 4/1970 | Leezer et al. | 229/201 |
| 3,521,741 | A * | 7/1970 | Beaudry | 229/117.17 |
| 3,669,346 | A * | 6/1972 | Leezer et al. | 229/201 |
| 3,901,431 | A * | 8/1975 | Carlson | 229/4.5 |
| 4,413,725 | A * | 11/1983 | Bruno et al. | 206/770 |
| 5,605,012 | A * | 2/1997 | Weder et al. | 47/64 |
| 6,195,938 | B1 * | 3/2001 | Kay | 47/77 |
| 6,427,379 | B1 * | 8/2002 | Lehner | 47/66.1 |
| 6,546,670 | B2 * | 4/2003 | Bautner | 47/77 |
| 2002/0157309 | A1 * | 10/2002 | Wibmer | 47/65.7 |
| 2008/0028678 | A1 * | 2/2008 | Banhagel | 47/73 |
| 2008/0248284 | A1 * | 10/2008 | Williams et al. | 428/323 |
| 2011/0135856 | A1 * | 6/2011 | Bell et al. | 428/34.2 |
| 2011/0289838 | A1 * | 12/2011 | Cirello | 47/65.7 |
| 2012/0175410 | A1 * | 7/2012 | Kissenpfennig et al. | 229/236 |

FOREIGN PATENT DOCUMENTS

| | | | |
|---|---|---|---|
| DE | 3616034 A1 | * | 11/1987 |
| FR | 2685994 A1 | * | 7/1993 |
| JP | 2003000073 A | * | 1/2003 |
| JP | 2005278481 A | * | 10/2005 |

OTHER PUBLICATIONS

Machine translation of FR 2685994 to Andre-Yves, published Jul. 1993.*

* cited by examiner

*Primary Examiner* — Son T Nguyen
*Assistant Examiner* — Kathleen Iwasaki
(74) *Attorney, Agent, or Firm* — Alston & Bird LLP

(57) ABSTRACT

A biodegradable plant pot is formed from a paperboard-based blank wrapped about an axis and having a first longitudinal edge portion overlapping and adhered to an opposite second longitudinal edge portion of the blank so as to form an overlap seam. The blank is oriented with the machine direction of the paperboard running substantially parallel to the axis and the cross-machine direction running substantially circumferentially about the side wall, such that the machine direction of the paperboard runs lengthwise along the overlap seam. Cuts are formed in the side wall adjacent to and at circumferentially opposite sides of one end of the overlap seam, the cuts being confined to a localized region adjacent the one end of the overlap seam. The end of the overlap seam is graspable and pullable in a direction generally toward the opposite end of the overlap seam, the cuts facilitating the starting of tearing of the blank along the overlap seam such that the overlap seam is torn from the side wall from the bottom edge to the top edge thereof.

13 Claims, 4 Drawing Sheets

BIODEGRADABLE PLANT POT

CROSS-REFERENCE TO RELATED APPLICATION

This application is related to U.S. patent application Ser. No. 12/632,212 filed on Dec. 7, 2009, currently pending, the entire disclosure of which is hereby incorporated herein by reference.

BACKGROUND OF THE INVENTION

The present disclosure relates to pots for containing growing plants, and particularly relates to plant pots that are biodegradable.

Plants that are raised for distribution in commerce are typically raised in a nursery or greenhouse until they are mature enough to be distributed to retail outlets. The vast majority of the time, molded plastic pots are used for raising the plants at the nursery. Consumers then purchase the plants in the pots and transplant the plants into soil at their home. The conventional plastic pots must be separated from the plants and discarded prior to planting the plants in the soil. The pots typically end up in landfills, where they remain for a very long time because they are not biodegradable.

BRIEF SUMMARY OF THE DISCLOSURE

The plant pot described in the present disclosure was developed as an alternative to such conventional plastic pots, a primary objective being to formulate the plant pot such that it will degrade relatively quickly when buried in soil. This allows the consumer to simply bury the pot with the plant in it, rather than having to remove the plant from the pot before planting. At the same time, the plant pot has features facilitating removal of the pot from the plant's root ball so that the consumer can easily remove the pot if desired.

A biodegradable plant pot in accordance with one embodiment described herein is formed of a blank comprising a sheet of paperboard having a machine direction and a cross-machine direction, the machine-direction tensile strength ($TS_{MD}$) of the paperboard exceeding a cross-machine-direction tensile strength ($TS_{CD}$) of the paperboard. The blank is wrapped about an axis and has a first longitudinal edge portion overlapping and adhered to an opposite second longitudinal edge portion of the blank so as to form an overlap seam that extends generally parallel to the axis, the blank thereby forming at least a side wall of the plant pot. The side wall extends from a bottom edge to a top edge, the top edge of the side wall circumscribing a top opening of the plant pot, the overlap seam having a bottom end at the bottom edge of the side wall and a top end at the top edge of the side wall. The pot includes a bottom wall joined to the side wall proximate the bottom edge thereof.

The blank is oriented with the machine direction of the paperboard running substantially parallel to the axis and the cross-machine direction running substantially circumferentially about the side wall, such that the machine direction of the paperboard runs lengthwise along the overlap seam.

A tear-starter feature is formed in the side wall at one end of the overlap seam. The tear-starter feature comprises cuts formed in the side wall adjacent to and at circumferentially opposite sides of the one end of the overlap seam, the cuts being confined to a localized region adjacent the one end of the overlap seam. The side wall otherwise is free of tear-propagating cuts or perforations along the overlap seam.

The one end of the overlap seam is graspable and pullable in a direction generally toward the opposite end of the overlap seam, the tear-starter feature facilitating the starting of tearing of the blank along the overlap seam such that the overlap seam is torn from the side wall from the bottom edge to the top edge thereof. This creates an opening in the side wall so that the plant's root ball can be removed from the pot more easily.

In one embodiment, an aperture or cutout is formed in the side wall proximate the one end of the overlap seam for providing a space for a user to insert a thumb or finger to aid in grasping and pulling the overlap seam. The tear-starter feature and the aperture or cutout in one embodiment are located at the bottom edge of the side wall, proximate a juncture between the side wall and the bottom wall.

In a particular embodiment described herein, the blank comprises a paperboard substrate formed of natural cellulose fibers, an internal sizing composition incorporated into the paperboard substrate so as to render the paperboard substrate substantially resistant to saturation by liquid water, and a thermoplastic polymer layer on one of the major surfaces of the paperboard substrate. The blank is oriented such that the thermoplastic polymer layer faces an interior of the plant pot and forms an inner surface thereof for contact with soil placed in the plant pot.

In this embodiment, the first and second longitudinal edge portions of the blank can be secured together by a heat seal between the thermoplastic polymer layer on one of the longitudinal edge portions and the paperboard substrate of the other longitudinal edge portion.

The thermoplastic polymer layer can be formed of polyolefin containing a biodegradation-enhancing additive.

In one embodiment, the bottom wall is formed by bottom panels that are integral portions of the blank, the bottom panels being folded inwardly and collectively forming the bottom wall. Side edges of adjacent ones of the bottom panels can be spaced apart when the blank is flat prior to wrapping about the axis, and overlap each other when the blank is wrapped about the axis and the bottom panels are folded inwardly.

The bottom wall of the plant pot can define a central hole therethrough, the central hole being defined as a space between distal ends of the bottom panels.

The plant pot can define a plurality of spaced-apart holes located at a juncture between the side wall and the bottom wall.

The bottom wall of the container can be recessed such that a center of the bottom wall is at a higher vertical level than the juncture between the side wall and the bottom wall.

Advantageously the paperboard of the blank is substantially non-square such that $TS_{MD}$ is at least 2.8 times $TS_{CD}$, and more preferably at least 3.5 times $TS_{CD}$.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
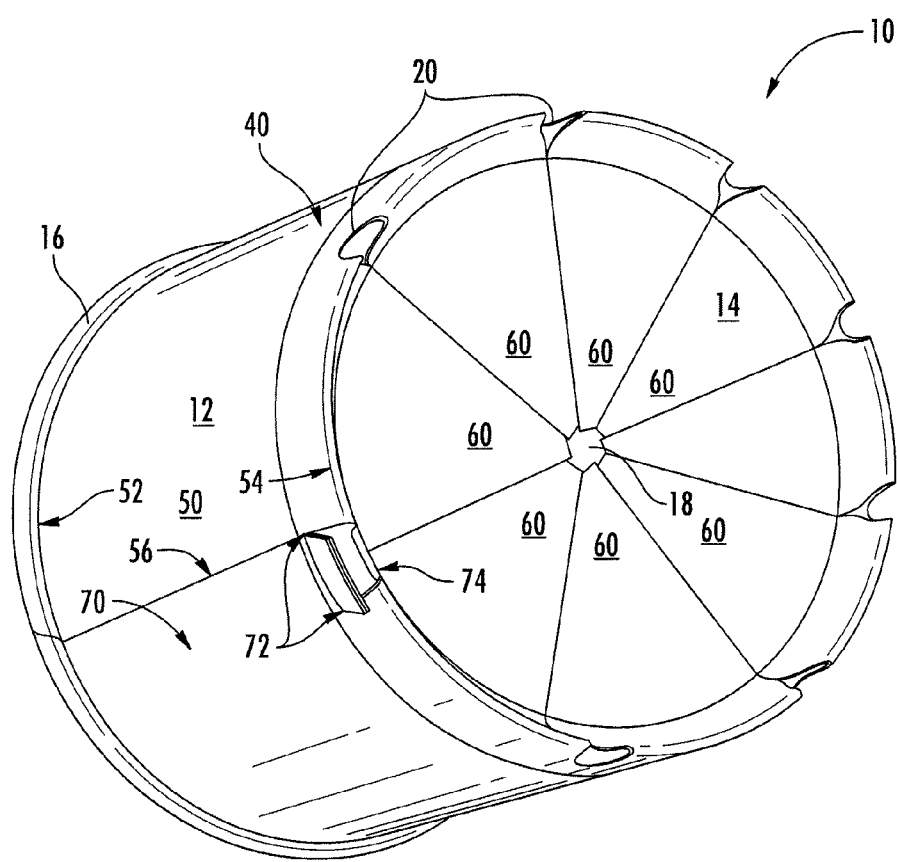
FIG. 1 is a perspective view of a plant pot in accordance with one embodiment described herein.
Figure 2:
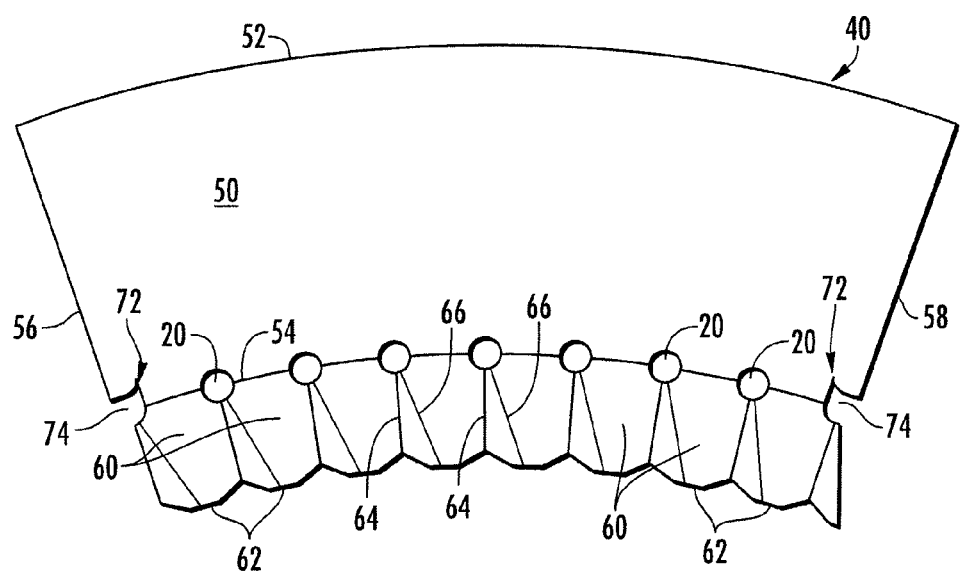
FIG. 2 depicts a flat blank from which the plant pot of FIG. 1 is constructed.

A plant pot 10 in accordance with one embodiment of the present invention is depicted in FIGS. 1-4. The pot 10 is constructed from a blank 40 (FIG. 2). The pot is formed by wrapping the blank 40 about an axis and securing opposite edges of the blank together, and folding portions of the blank to form a bottom for the pot, as further described below. The pot includes a side wall 12 and a bottom wall 14. The side wall 12 advantageously is conical in configuration so that empty pots 10 can be nested during shipping and storage. A rolled rim 16 can be formed at the top edge of the side wall 12 for added rigidity if desired. The bottom wall 14 has a central hole 18 through it, and the pot has additional holes 20 located at the juncture of the side wall 12 and the bottom wall 14.

The blank 40 comprises a sheet of flexible material. The sheet comprises a paperboard substrate formed of natural cellulose fibers and having an internal sizing composition incorporated into the paperboard substrate so as to render the paperboard substrate substantially resistant to saturation by liquid water, and a thermoplastic polymer layer on one of the major surfaces of the paperboard substrate. The other major surface of the paperboard substrate can be free of any polymer layer. The paperboard substrate can be made from recycled papermaking fibers. The internal sizing composition can comprise, for example, alkyl ketene dimer (AKD) added to the papermaking furnish at a concentration of about 10 to 50 pounds per ton of dry furnish, more preferably about 20 to 40 pounds per ton, and most preferably about 30 to 40 pounds per ton. Alternatively, other sizing compositions, such as alkenyl succinic anhydride (ASA), could be used.

The thermoplastic polymer making up the polymer layer can comprise a polyolefin such as polyethylene, and optionally can include a biodegradation-enhancing additive. For example, the additive can comprise a prodegradant additive such as used in so-called oxo-biodegradable (OBD) plastics. The prodegradant is a metal salt that catalyzes the oxidation of the polyolefin so as to scissor the long polymer chains into shorter chain molecules that are then available for biomineralization by microorganisms such as bacteria and fungi. Other examples of biodegradation-enhancing additives that can be employed include starch additives as well as coatings (e.g., polylactic acid or PLA) that degrade the polymer via hydrolysis.

The sheet is die cut to form the blank 40. The blank includes a side wall panel 50 having a top edge 52, a bottom edge 54, a first side edge 56, and a second side edge 58 (not visible in FIG. 1), and a plurality of bottom panels 60 (FIG. 2) that are integrally formed with the side wall panel 50 and extend from the bottom edge 54. Each bottom wall panel 60 includes a distal end that defines a free edge 62, a proximal end joined to the bottom edge 54 of the side wall panel 50 along a fold line, and a pair of opposite side edges that extend between the proximal and distal ends. The bottom panels 60 either can be separate and distinct from one another, or (as illustrated in FIG. 2) adjacent bottom panels can be connected to each other along a common fold line 64, and each bottom panel can define a further fold line 66 to allow the panel to fold an partially overlap the adjacent bottom panel in order to form the bottom of the pot when the blank is wrapped into a tubular or conical shape. The blank 40 includes holes 20 at the junctures of the fold lines 64, 66 with the bottom edge 54.

The side wall panel 50 has an arcuate shape in plan view, such that the top and bottom edges 52, 54 are substantially circular arcs, and the side edges are substantially radial with respect to those circular arcs. The bottom panels 60 have their lengthwise axes oriented generally radially with respect to the edges 52, 54.

The blank 40 is formed into a pot 10 by wrapping the side wall panel 50 of the blank about an axis until a longitudinal edge portion of the blank adjacent the side edge 56 overlaps the longitudinal edge portion of the blank adjacent the opposite side edge 58, with the polymer layer on one of those edge portions in contact with the paperboard substrate of the other edge portion, thus forming a straight lap joint, and heating the lap joint to melt the polymer layer on the one edge portion so that it adheres to the paperboard substrate of the other edge portion, thereby securing the edge portions together. The bottom panels 60 are folded inwardly about the fold lines at the bottom edge 54 and are folded along their fold lines 64, 66 so that the bottom panels partially overlap one another in a petal fashion such that the polymer layer of one bottom panel is in contact with the paperboard substrate of an adjacent bottom panel, and the bottom panels are heat-sealed together via the polymer layer, similar to how the edge portions of the side wall panel are heat-sealed together.

As noted, the blank 40 defines a series of holes 20 located at the bottom edge 54 of the side wall panel. Each hole 20 (except for the endmost holes) is located between the proximal ends of two adjacent bottom panels 60, and is formed partly in the side wall panel 50 and partly in the two adjacent bottom panels 60. Accordingly, when the blank is wrapped and formed into a pot as described in the preceding paragraph, the resulting pot has holes 20 located at the juncture between the side wall 12 and the bottom wall 14, as best seen in FIG. 1.

The bottom wall 14 of the pot, formed by the overlapping bottom panels 60, advantageously is recessed as best seen in FIG. 1. The center of the bottom wall thus is at a higher vertical level than the juncture between the side wall 12 and the bottom wall 14, which juncture defines an outer rim on which the pot rests. The recessed bottom wall may help resist sagging of the bottom wall.

As noted, the bottom wall 14 defines a central hole 18 that results from the fact that the bottom panels 60 are not long enough to have the distal ends of two diametrically opposite bottom panels meet. The hole 18 and the holes 20 allow water drainage from the pot while the pot is in the nursery or in a retail outlet, and also allow the plant's roots to grow through them after the pot is buried in soil.

The blank 40 is wrapped and formed into the pot 10 such that the polymer layer of the blank faces the interior of the pot and thus is adjacent to the soil or other growing medium contained in the pot. The polymer layer thus not only serves to heat seal the lap joints when the blank is wrapped and folded to form the pot, but also serves as a moisture barrier between the moist soil in the pot and the paperboard substrate of the blank.

The blank 40 can include an antifungal material to resist formation of mold or fungus on the pot while it is in the nursery or in a retail outlet. The antifungal material can be incorporated into the paperboard substrate during the papermaking process, or can be applied to the paperboard substrate after its formation.

Optionally, the plant pot 10 can include additional features to resist wetting of the paperboard during the time the pot is kept in a greenhouse or the like. For example, one optional feature is a water-resistant coating (e.g., paraffin or other wax) applied to the exterior bottom portion of the pot to help resist wetting when the pot sits in a puddle of water on a greenhouse bench or the like for a prolonged period of time.

Another optional feature is a water-resistant coating applied to substantially the entire exterior surface of the pot. The coating can be a water-based composition such as an aqueous emulsion of a polymer (e.g., polypropylene, acrylic, etc.). An antifungal agent can be incorporated into the water-based composition for added resistance to mold and fungus.

The description of the plant pot thus far has addressed features that are generally similar to those of the aforementioned co-pending patent application Ser. No. 12/632,212. The plant pot 10 of the present application, however, differs from that of the '212 application in that it includes a provision to facilitate removal of the pot from the plant's root ball, if that is desired by the user prior to planting the plant in soil. In this regard, the blank 40 making up the pot 10 comprises a sheet formed predominantly of paperboard having a machine direction and a cross-machine direction. The machine-direction tensile strength ($TS_{MD}$) of the paperboard exceeds a cross-machine-direction tensile strength ($TS_{CD}$) of the paperboard. When the blank 40 is wrapped about the axis of the pot and one longitudinal edge portion overlaps and is adhered to the opposite longitudinal edge portion of the blank, an overlap seam 70 is formed that extends generally parallel to the axis. The overlap seam has a bottom end at the bottom edge of the side wall and a top end at the top edge of the side wall (FIG. 1).

A key aspect of the present plant pot is that the blank 40 is oriented with the machine direction running substantially parallel to the axis of the pot and the cross-machine direction running substantially circumferentially about the side wall, such that the machine direction of the paperboard runs lengthwise along the overlap seam 70. The pot can optionally include a tear-starter feature formed in the side wall at one end of the overlap seam 70. The tear-starter feature can comprise cuts 72 formed in the side wall adjacent to and at circumferentially opposite sides of the one end of the overlap seam 70. The cuts are confined to a localized region adjacent the one end of the overlap seam. The side wall otherwise is free of tear-propagating cuts or perforations along the overlap seam 70. Indeed, any such cuts or perforations are undesirable because they tend to reduce the wet strength of the pot and thus risk the pot prematurely breaking along the overlap seam 70 before the user is ready to plant the growing plant in soil. Therefore, the only cuts or perforations are the starter cuts 72 at the end of the overlap seam 70.

Figure 3:
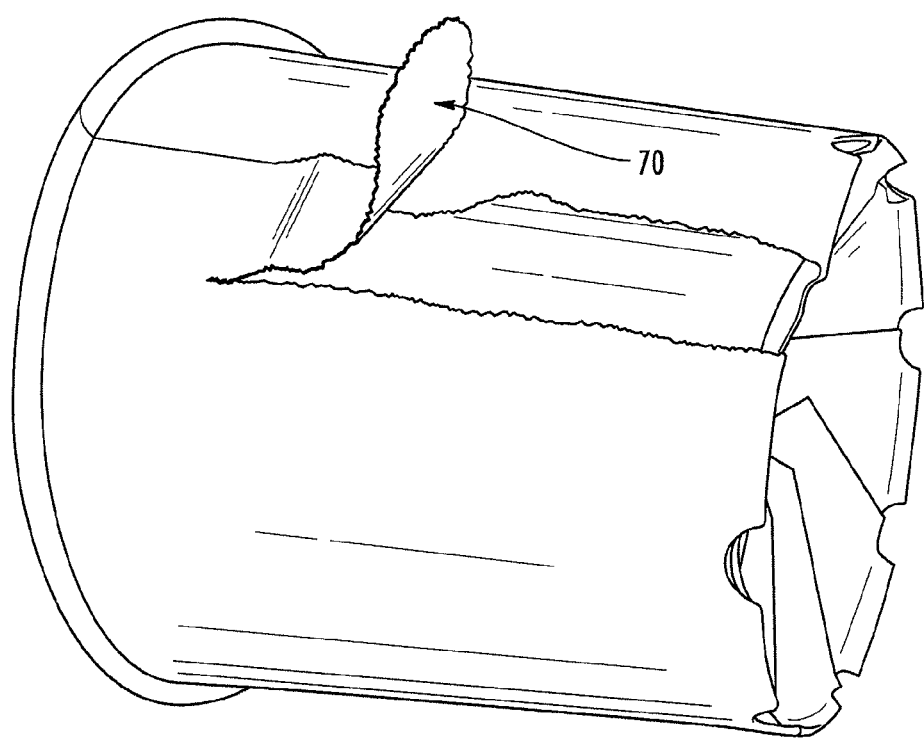
FIG. 3 is a perspective view of the pot of FIG. 1 with the overlap seam partially torn from the pot.
Figure 4:
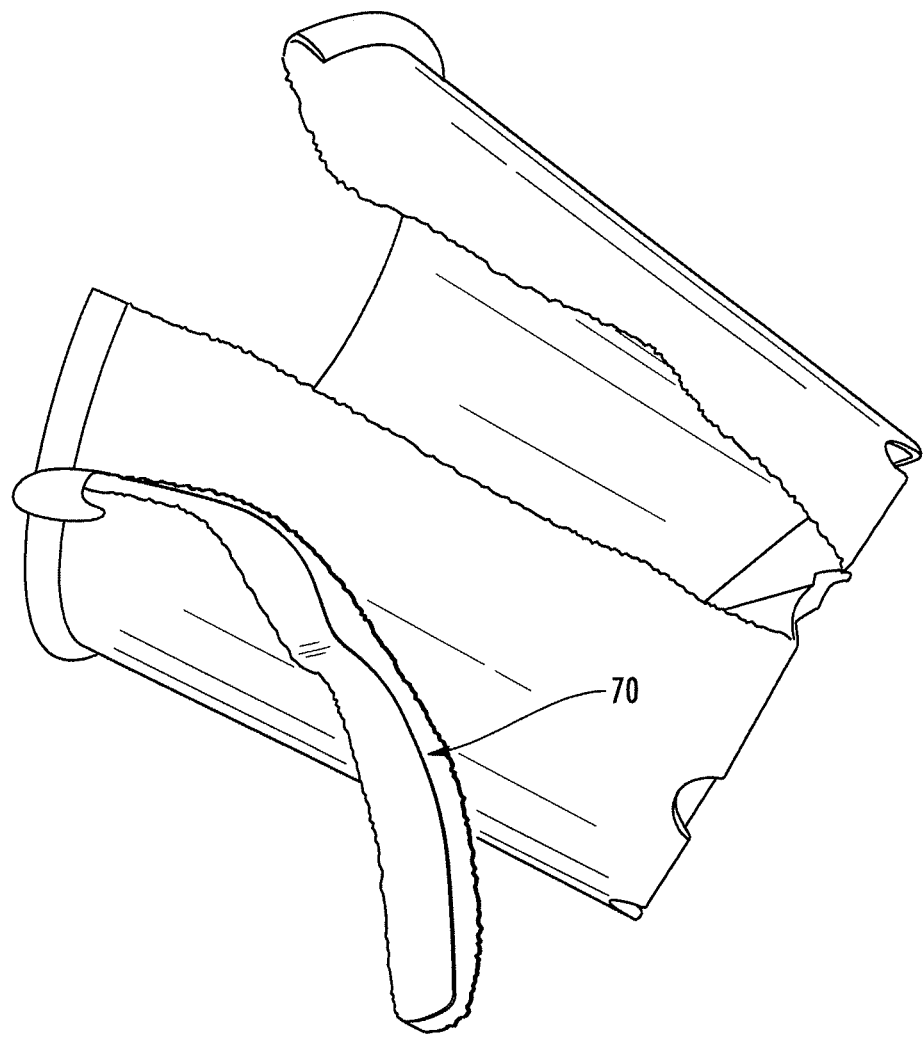
FIG. 4 is a perspective view of the pot with the overlap seam completely torn from the pot.

The one end of the overlap seam 70 is graspable and pullable in a direction generally toward the opposite end of the overlap seam. To facilitate this, the pot can include an aperture or cutout 74 in the side wall proximate the one end of the overlap seam 70 for providing a space for a user to insert a thumb or finger to aid in grasping and pulling the one end of the overlap seam. The tear-starter feature 72 facilitates the starting of tearing of the blank along the overlap seam. Thus, the overlap seam is torn from the side wall from the bottom edge to the top edge thereof as illustrated in FIGS. 3 and 4. This allows the pot 10 to be opened up at the resulting gap in the side wall. A number of options are then possible. The pot can be completely removed from the plant's root ball and discarded in the trash for pickup along with other trash to be taken to a landfill. Alternatively, the pot can be left in place surrounding the root ball and the pot and plant can be planted in the soil. In this case, the large gap in the side wall of the pot will allow roots to grow outward without any hindrance. Still another option is to remove the pot from the root ball and bury the pot in soil separately from the plant's root ball. In any of these options, the pot itself will biodegrade relatively quickly, particularly when it is buried in soil.

Unexpectedly, it has been found that the tearing away of the overlap seam 70 as described above actually hastens the biodegradation of the pot when it is buried in soil. Some tests were conducted to determine the biodegradability of a plant pot in accordance with the present invention. Two identical pots were prepared. The pots were constructed as described above, made from a blank comprising a paperboard substrate having an internal sizing composition incorporated into the paperboard substrate, and having a polyethylene layer on both of the major surfaces of the paperboard substrate. The polyethylene layers included a biodegradation-enhancing additive. Each of the pots contained the same quantity of the same growing medium and a seedling plant of the same type. The pots were buried in soil in the late spring in South Carolina and were left in the ground for about 6 weeks. One pot was left intact when it was buried. For the other pot, the overlap seam was torn from the pot, and both the pot and the torn-free overlap seam were buried in the hole. At the end of the 6-week period, the pots were dug up, observed, and weighed (after removing the plants and as much growing medium and soil as possible). The intact pot had biodegraded to a significant extent and had a weight of 29.5 grams. The pot from which the overlap seam had been torn, however, had biodegraded to a much greater extent, and the combined weight of the pot and overlap seam was 9.5 grams. This result was quite surprising, as such a great disparity in biodegradation rates had not been predicted. It is theorized that the tearing away of the overlap seam from the pot exposed a substantial surface area of paperboard that was not covered with the polyethylene layers and thus allowed moisture to permeate the paperboard faster and to a greater extent than in the intact pot where the only exposed paperboard areas were at the cut edges of the blank.

Whatever mechanism is responsible for the effect observed in the test, the present invention represents the only instance known to the applicant in which a tear strip (overlap seam) on an article has been used to enhance biodegradability of the article when buried in soil.

In order for the pot 10 to function as intended, it is important that the entirety of the overlap seam 70 tear free of the pot in one piece when it is pulled. For this to occur, the overlap seam must have sufficient strength in the pull direction (tensile strength) relative to the shear strength of the material as it is torn along the overlap seam. These requirements are facilitated by three synergistic aspects of the pot 10: (1) the overlap seam 70 is a double-layered structure, which automatically enhances its tensile strength relative to the shear strength of the single-layered material in each side of the overlap seam; (2) the machine direction of the paperboard is oriented in the vertical direction of the pot 10, and thus is oriented along the length direction of the overlap seam; and (3) the paperboard is non-square, meaning that its machine-direction tensile strength ($TS_{MD}$) exceeds its cross-machine-direction tensile strength ($TS_{CD}$). It has been found that this third aspect is of particular importance to the ability of the overlap seam to be torn completely from the pot in one piece. Advantageously the ratio $TS_{MD}:TS_{CD}$ is at least 2.8, and more preferably is at least 3.5. This requirement is typically met by using paperboard made on cylinder machines, which usually produce highly oriented paperboard having the requisite minimum MD:CD strength ratio. In contrast, paperboard made on Fourdrinier-type machines typically is more-nearly square and thus would not have the requisite minimum MD/CD strength ratio.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A biodegradable plant pot, comprising:
a blank comprising a sheet formed predominantly of paperboard having a machine direction and a cross-machine direction, the machine-direction tensile strength ($TS_{MD}$) of the paperboard exceeding a cross-machine-direction tensile strength ($TS_{CD}$) of the paperboard, the blank being wrapped about an axis and having a first longitudinal edge portion overlapping and adhered to an opposite second longitudinal edge portion of the blank so as to form an overlap seam that extends generally parallel to the axis, the blank thereby forming at least a side wall of the plant pot, the side wall extending from a bottom edge to a top edge, the top edge of the side wall circumscribing a top opening of the plant pot, the overlap seam having a bottom end at the bottom edge of the side wall and a top end at the top edge of the side wall;
a bottom wall joined to the side wall proximate the bottom edge thereof;
wherein the blank is oriented with the machine direction running substantially parallel to the axis and the cross-machine direction running substantially circumferentially about the side wall, such that the machine direction of the paperboard runs lengthwise along the overlap seam;
a tear-starter feature formed in the side wall at one end of the overlap seam, the tear-starter feature comprising cuts formed in the side wall adjacent to and at circumferentially opposite sides of said one end of the overlap seam, one of said cuts being formed in said first longitudinal edge portion of the blank and another of said cuts being formed in said second longitudinal edge portion of the blank, the cuts being confined to a localized region adjacent said one end of the overlap seam, the side wall otherwise being free of tear-propagating cuts or perforations along the overlap seam;
said one end of the overlap seam being graspable and pullable in a direction generally toward the opposite end of the overlap seam, the tear-starter feature facilitating the starting of tearing of the blank along the overlap seam such that the overlap seam is torn from the side wall from the bottom edge to the top edge thereof.

2. The biodegradable plant pot of claim 1, further comprising an aperture or cutout in the side wall proximate said one end of the overlap seam for providing a space for a user to insert a thumb or finger to aid in grasping and pulling said one end of the overlap seam.

3. The biodegradable plant pot of claim 2, wherein the tear-starter feature and the aperture or cutout are located at the bottom edge of the side wall, proximate a juncture between the side wall and the bottom wall.

4. The biodegradable plant pot of claim 1, wherein the top edge of the side wall defines an outwardly rolled rim.

5. The biodegradable plant pot of claim 1, wherein the blank comprises:
a paperboard substrate formed of natural cellulose fibers, the paperboard substrate having a thickness defined between opposite major surfaces thereof;
an internal sizing composition incorporated into the paperboard substrate so as to render the paperboard substrate substantially resistant to saturation by liquid water; and
a thermoplastic polymer layer on one of the major surfaces of the paperboard substrate;
the blank being oriented such that the thermoplastic polymer layer faces an interior of the plant pot and forms an inner surface thereof for contact with soil placed in the plant pot.

6. The biodegradable plant pot of claim 5, wherein the first and second longitudinal edge portions of the blank are secured together by a heat seal between the thermoplastic polymer layer on one of the longitudinal edge portions and the paperboard substrate of the other longitudinal edge portion.

7. The biodegradable plant pot of claim 6, wherein the thermoplastic polymer layer is formed of polyolefin containing a biodegradation-enhancing additive.

8. The biodegradable plant pot of claim 1, wherein the bottom wall is formed by bottom panels that are integral portions of the blank, the bottom panels being folded inwardly and collectively forming the bottom wall.

9. The biodegradable plant pot of claim 8, wherein the bottom wall of the plant pot defines a central hole therethrough, the central hole being defined as a space between distal ends of the bottom panels.

10. The biodegradable plant pot of claim 9, wherein the plant pot defines a plurality of spaced-apart holes located at a juncture between the side wall and the bottom wall.

11. The biodegradable plant pot of claim 8, wherein the bottom wall is recessed such that a center of the bottom wall is at a higher vertical level than the juncture between the side wall and the bottom wall.

12. The biodegradable plant pot of claim 1, wherein a ratio of $TS_{MD}$ to $TS_{CD}$ is at least 2.8.

13. The biodegradable plant pot of claim 12, wherein said ratio is at least 3.5.

* * * * *